United States Patent
Sato et al.

(10) Patent No.: US 6,456,735 B1
(45) Date of Patent: Sep. 24, 2002

(54) IMAGE DISPLAY METHOD AND APPARATUS

(75) Inventors: Natsuko Sato, Tokyo; Manabu Minami, Kanagawa, both of (JP)

(73) Assignee: GE Yokogawa Medical Systems, Limited, Tokyo (JP)

( * ) Notice: Subject to any disclaimer, the term of this patent is extended or adjusted under 35 U.S.C. 154(b) by 0 days.

(21) Appl. No.: 09/347,699

(22) Filed: Jul. 3, 1999

(30) Foreign Application Priority Data

Jul. 27, 1998 (JP) .......................................... 10-210596

(51) Int. Cl.⁷ ................................................. G06K 9/00
(52) U.S. Cl. ...................................................... 382/131
(58) Field of Search ................................. 382/128, 130, 382/131, 276, 312; 600/101, 103, 104, 109, 111, 113, 117, 160, 163, 164, 170, 171, 173, 184, 300, 309; 348/65, 72, 77; 606/46

(56) References Cited

U.S. PATENT DOCUMENTS

| | | | | |
|---|---|---|---|---|
| 4,493,537 A | * | 1/1985 | Nakahashi | 359/783 |
| 5,313,306 A | * | 5/1994 | Kuban et al. | 348/65 |
| 5,891,030 A | * | 4/1999 | Johnson et al. | 600/407 |
| 6,002,430 A | * | 12/1999 | McCall et al. | 348/207 |
| 6,223,100 B1 | * | 4/2001 | Green | 700/264 |
| 6,333,826 B1 | * | 12/2001 | Charles | 359/725 |

* cited by examiner

Primary Examiner—Andrew W. Johns
Assistant Examiner—Shervin Nakhjavan
(74) Attorney, Agent, or Firm—Moonray Kojima

(57) ABSTRACT

In order to enable the observation of a wide range of the wall surface of a three-dimensional tissue in one screen, an image providing a view from a viewpoint E1 in a field-of-view centerline direction SC with a view angle of θ greater than 180° is produced and displayed.

14 Claims, 6 Drawing Sheets

FIG. 8
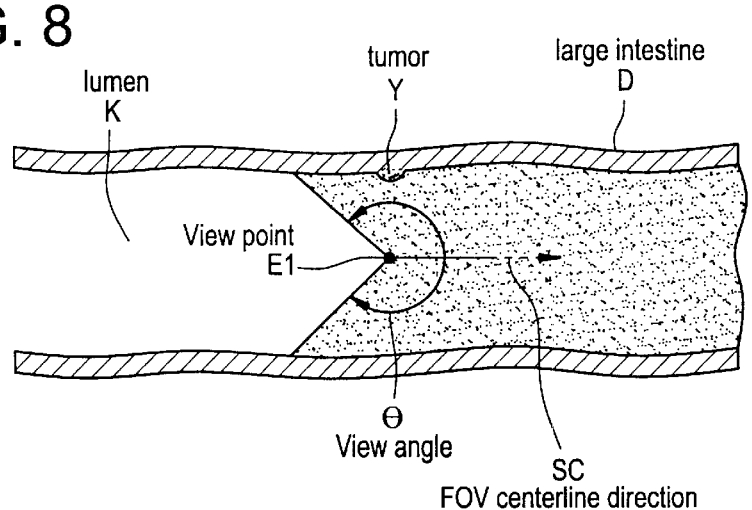
FIG. 9
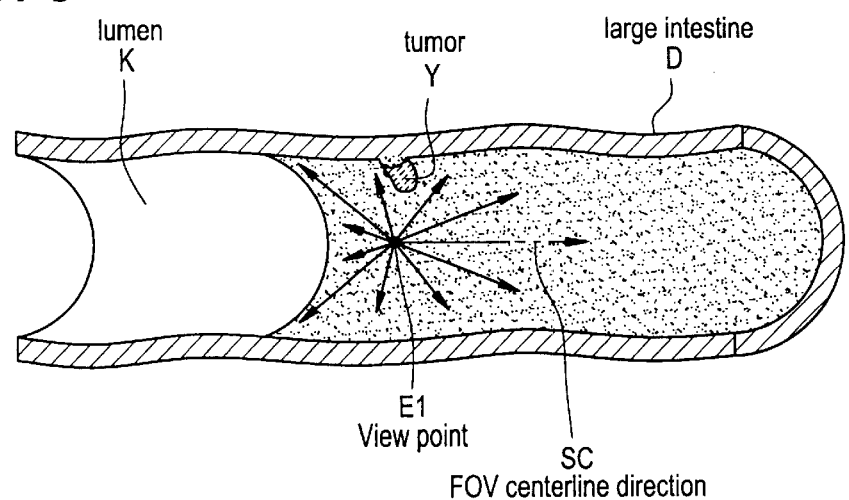
FIG. 10
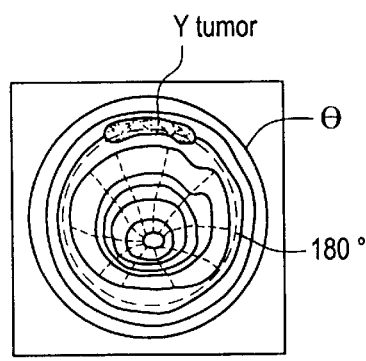
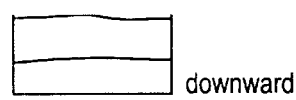

IMAGE DISPLAY METHOD AND APPARATUS

BACKGROUND OF THE INVENTION

The present invention relates to an image display method and apparatus, and more particularly to an image display method and apparatus which enables the observation of a wide range of the wall surface of a three-dimensional tissue in one screen.

Japanese Patent Application Laid Open No. 10-31761 discloses an image display method and apparatus for producing and displaying an image of the wall surface of an internal space of a three-dimensional tissue (a structure in a living body, such as the digestive organs and the blood vessels) as seen from a viewpoint in the internal space, using data acquired by image information acquiring means such as an X-ray CT (computed tomography) apparatus and an MRI (magnetic resonance imaging) diagnostic apparatus.

While the technique disclosed in the above application can display a three-dimensional image of the wall surface of the digestive organs or the blood vessels as seen from their internal space, the three-dimensional image is simulant of an image as provided by an optical endoscope (straight vision endoscope) having a view angle of about 90°, and therefore does not enable the observation of a wide range in one screen.

SUMMARY OF THE INVENTION

It is an object of the present invention to provide an image display method and apparatus which enables the observation of a wide range of the wall surface of a three-dimensional tissue in one screen.

In accordance with a first aspect of the invention, there is provided an image display method for producing an image of the wall surface of an internal space of a three-dimensional tissue as seen from a viewpoint in the internal space using data acquired from a subject, and for displaying the image, wherein the image provides a view in a field-of-view centerline direction with a view angle greater than 180°.

It is difficult to give an optical endoscope a large view angle because of its physical limitations. On the other hand, there is no physical limitation when an image is produced from data acquired by an X-ray CT apparatus, an MRI apparatus or the like, and it is possible to expand a view angle although arithmetic processing is increased.

In the image display method as described regarding the first aspect, an image is produced and displayed with a view angle greater than 180°, instead of simulating an optical endoscope. Thus, a wide range of the wall surface of a three-dimensional tissue can be observed in one screen.

In accordance with a second aspect of the invention, there is provided an image display method for producing an image of the wall surface of an internal space of a three-dimensional tissue as seen from a viewpoint in the internal space using data acquired from a subject, and for displaying the image, wherein the image provides a view 360° around about the viewpoint with a view angle smaller than 180°.

In the image display method of the second aspect, an image is produced and displayed as if the three-dimensional tissue is cut into a short cylinder and unfolded so that the whole wall surface of its internal space can be observed. Thus, a wide range of the wall surface of a three-dimensional tissue can be observed in one screen.

In accordance with a third aspect of the invention, there is provided an image display method for producing an image of the wall surface of an internal space of a three-dimensional tissue as seen from a viewpoint in the internal space using data acquired from a subject, and for displaying the image, wherein a plurality of the images provide respective views from the viewpoint in directions of three orthogonal axes including the axis of a field-of-view centerline direction and having the viewpoint as an origin.

In the image display method of the third aspect, a screen is produced and displayed which enables the simultaneous observation of a combination of a plurality of images respectively providing front (in the field-of-view centerline direction), back, left, right, upward and downward views from a viewpoint in an internal space of a three-dimensional tissue. Thus, a wide range of the wall surface of the three-dimensional tissue can be observed in one screen.

In accordance with a fourth aspect of the invention, there is provided an image display apparatus for producing and displaying an image of the wall surface of an internal space of a three-dimensional tissue as seen from a viewpoint in the internal space using data acquired from a subject, comprising viewpoint/field-of-view centerline direction specifying means for specifying a viewpoint and a field-of-view centerline direction, and super wide-angle endoscopic screen producing and displaying means for producing and displaying a screen providing a view from the viewpoint in the field-of-view centerline direction with a view angle greater than 180°.

The image display apparatus of the fourth aspect can suitably implement the image display method as described regarding the first aspect.

In accordance with a fifth aspect of the invention, there is provided an image display apparatus for producing and displaying an image of the wall surface of an internal space of a three-dimensional tissue as seen from a viewpoint in the internal space using data acquired from a subject, comprising viewpoint/field-of-view centerline direction specifying means for specifying a viewpoint and a field-of-view centerline direction, and omnidirectional periscopic screen producing and displaying means for producing and displaying a screen providing a view 360° around about the viewpoint with a view angle smaller than 180°.

The image display apparatus of the fifth aspect can suitably implement the image display method as described regarding the second aspect.

In accordance with a sixth aspect of the invention, there is provided an image display apparatus for producing and displaying an image of the wall surface of an internal space of a three-dimensional tissue as seen from a viewpoint in the internal space using data acquired from a subject, comprising viewpoint/field-of-view centerline direction specifying means for specifying a viewpoint and a field-of-view centerline direction, and multi-image screen producing and displaying means for producing and displaying a screen having a plurality of images arranged providing respective views in directions of three orthogonal axes including the axis of the field-of-view centerline direction and having the viewpoint as an origin.

The image display apparatus of the sixth aspect can suitably implement the image display method as described regarding the third aspect.

Thus, according to the image display method and apparatus of the present invention, a wide range of the wall surface of a three-dimensional tissue can be observed in one screen, and lesion sites can be quickly detected.

Further objects and advantages of the present invention will be apparent from the following description of the preferred embodiments of the invention as illustrated in the accompanying drawings.

BRIEF DESCRIPTION OF THE DRAWINGS

FIG. 8 is a sectional end view illustrating a view angle greater than 180°.

FIG. 9 is a sectional perspective view illustrating a view angle greater than 180°.

FIG. 10 exemplarily shows a super wide-angle endoscopic screen.

DETAILED DESCRIPTION OF THE INVENTION

The present invention will now be described in more detail with reference to embodiments shown in the accompanying drawings.

Figure 1:
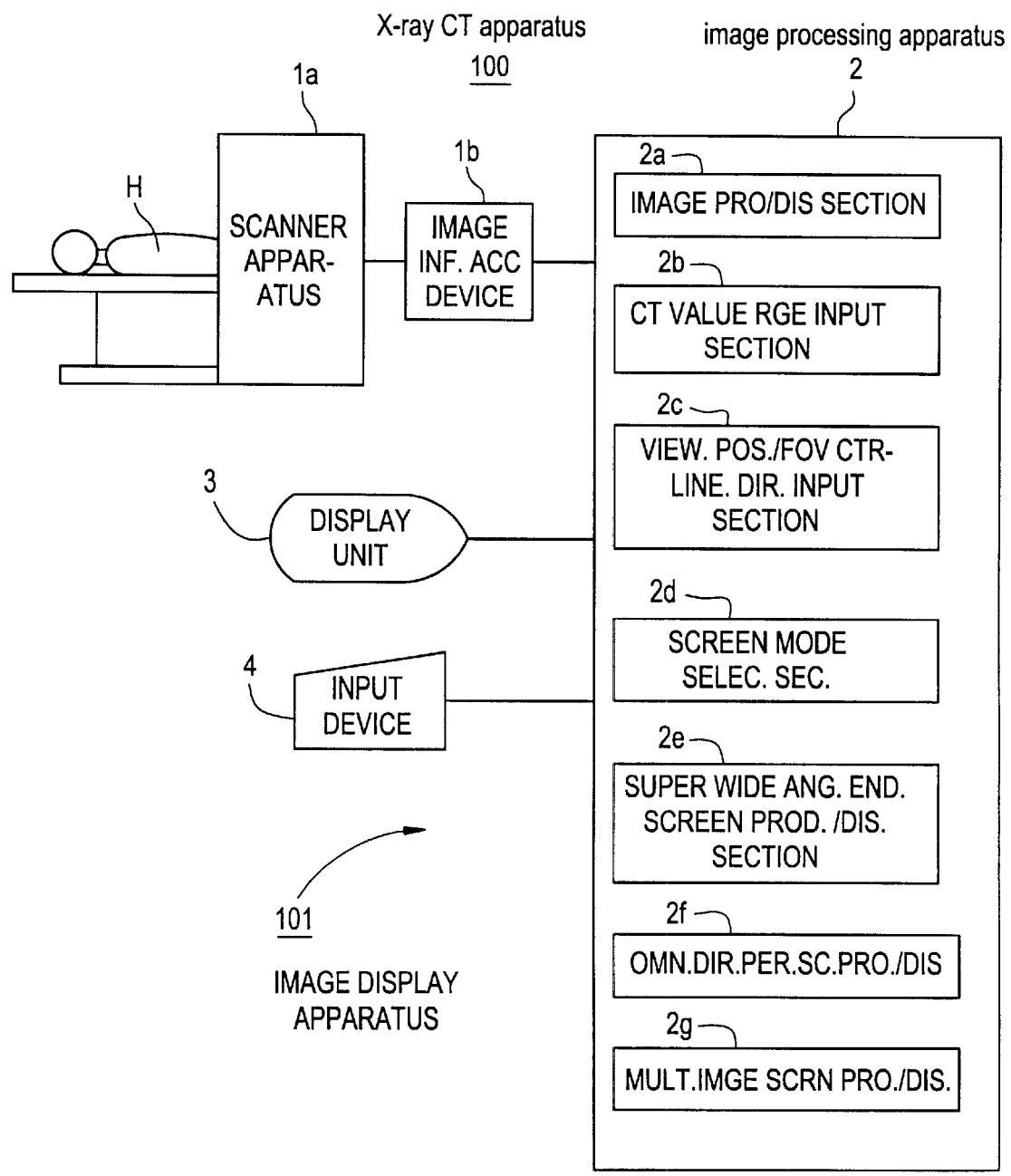
FIG. 1 is a configuration diagram of an X-ray CT apparatus comprising an image display apparatus in accordance with one embodiment of the present invention.

FIG. 1 is a configuration diagram of an X-ray CT apparatus 100 comprising an image display apparatus 101 in accordance with one embodiment of the present invention.

A scanner apparatus 1a scans a subject H at different slice positions (a slice represents a planar region to be imaged in tomography), and acquires scan data for a plurality of slices.

An image accumulating means 1b accumulates the scan data.

The image display apparatus 101 is comprised of an image processing apparatus 2, a display unit 3 and an input device 4.

The image processing apparatus 2 includes a two-dimensional image producing and displaying section 2a, a CT value range input section 2b, a viewpoint position/field-of-view centerline direction input section 2c, a screen mode selecting section 2d, a super wide-angle endoscopic screen producing and displaying section 2e, an omnidirectional periscopic screen producing and displaying section 2f, and a multi-image screen producing and displaying section 2g.

The two-dimensional image producing and displaying section 2a processes the scan data for the plurality of slices, produces two-dimensional image data for the slices, and displays two-dimensional images on the display unit 3.

A human operator reads a CT value range of the internal tissue whose three-dimensional image in the endoscopic mode is to be produced, from the two-dimensional image, and inputs the CT value range via the input device 4.

The CT value range input section 2b receives the input CT value range, and passes it to the super wide-angle endoscopic screen producing and displaying section 2e, the omnidirectional periscopic screen producing and displaying section 2f, and the multi-image screen producing and display section 2g.

The operator fixes a viewpoint position (a position of lens of an imaginary endoscope) in the internal space of the internal tissue, and inputs the viewpoint position via the input device 4. The operator also inputs a field-of-view centerline direction (an optical axis direction of the lens of the imaginary endoscope) via the input device 4.

The viewpoint position/field-of-view centerline direction input section 2c receives the input viewpoint position and field-of-view centerline direction, and passes them to the super wide-angle endoscopic screen producing and displaying section 2e, the omnidirectional periscopic screen producing and displaying section 2f, and the multi-image screen producing and display section 2g.

The operator then selects a mode of a screen to be displayed among a super wide-angle endoscopic screen, an omnidirectional periscopic screen and a multi-image screen via the input device 4.

The image mode selecting section 2d either activates the super wide-angle endoscopic screen producing and displaying section 2e when the super wide-angle endoscopic screen is selected, activates the omnidirectional periscopic screen producing and displaying section 2f when the omnidirectional periscopic screen is selected, or activates the multi-image screen producing and display section 2g when the multi-image screen is selected.

The super wide-angle endoscopic screen producing and displaying section 2e produces a screen (see FIG. 10) providing a view from the viewpoint in the field-of-view centerline direction with a view angle greater than 180°, and displays the screen. The process is described in more detail later.

The omnidirectional periscopic screen producing and displaying section 2f produces a screen (see FIG. 4) providing a view 360° around about the viewpoint with a view angle smaller than 180°, and displays the screen. The process is described in more detail later.

Figure 14:
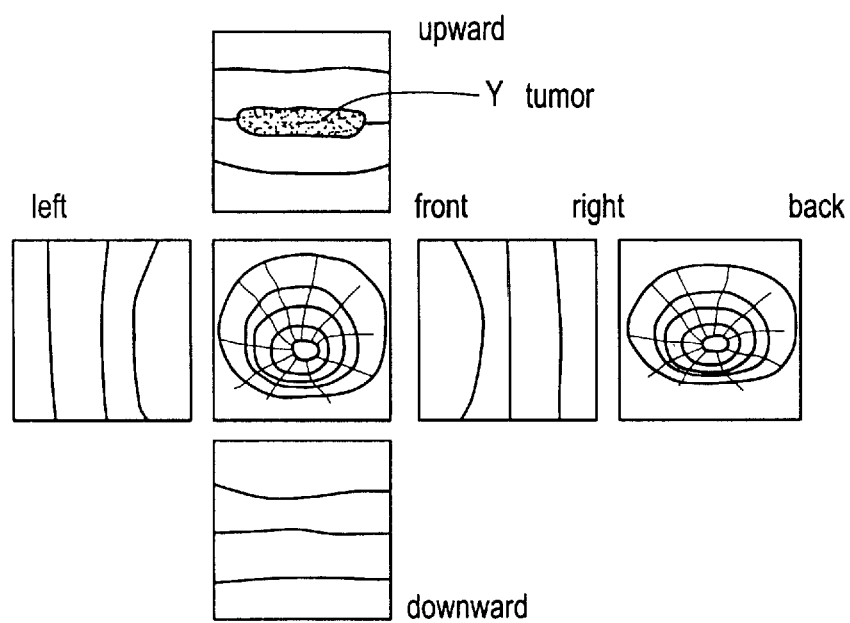
FIG. 14 exemplarily shows a multi-image screen.

The multi-image screen producing and displaying section 2g produces a screen (see FIG. 14) having a plurality of images arranged providing respective views in three orthogonal directions including the axis of the field-of-view centerline direction and having the viewpoint as an origin, and displays the screen. The process is described in more detail later.

Figure 5:
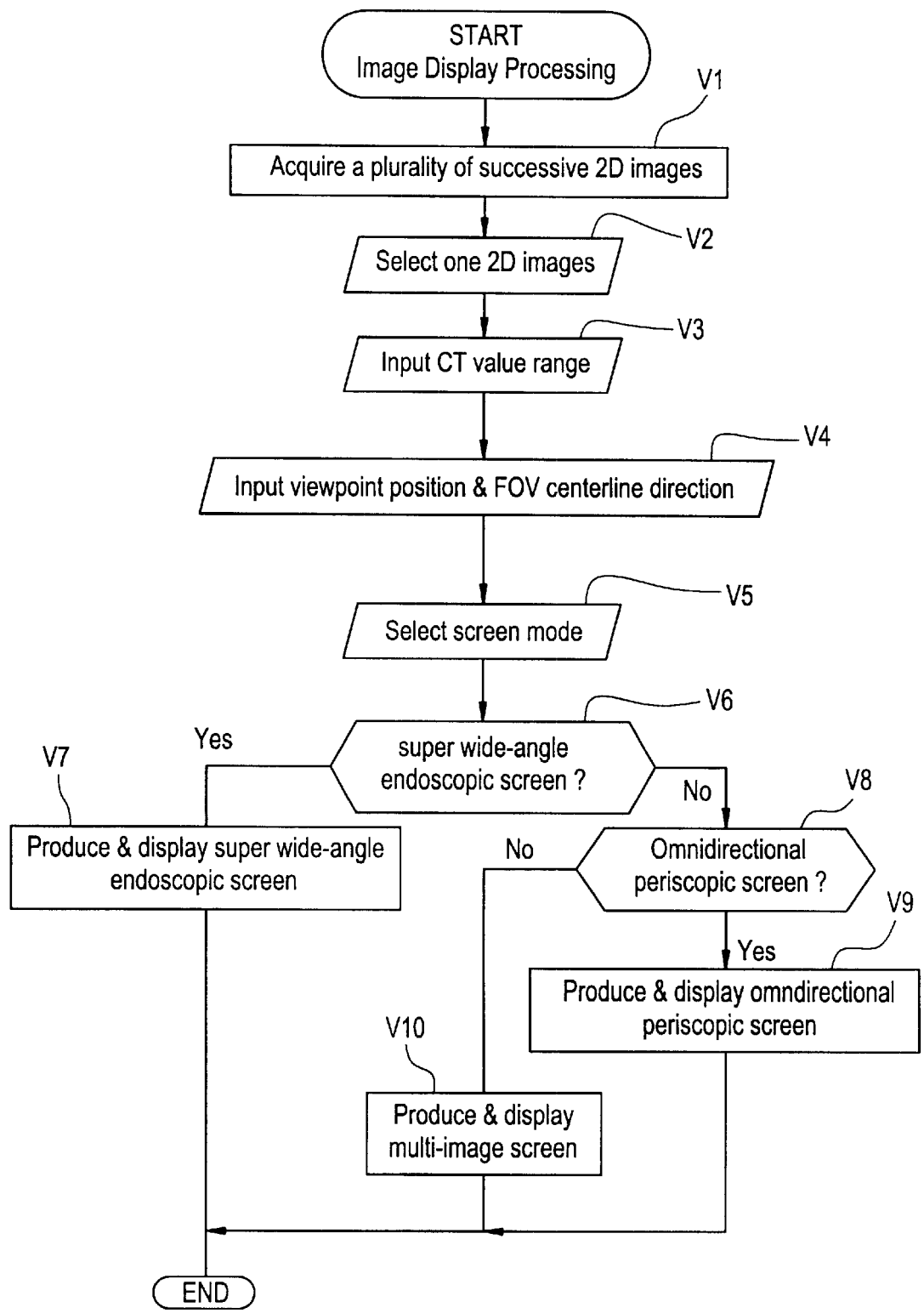
FIG. 5 is a flow chart of a procedure of displaying a three-dimensional image in the endoscopic mode using the image display apparatus of FIG. 1.

FIG. 5 is a flow chart illustrating the operation for producing and displaying a three-dimensional image in the endoscopic mode by means of the image display apparatus 101.

In Step V1, data for a plurality of two-dimensional images are acquired by scanning the subject H at a plurality of successive slice positions.

Figure 6:
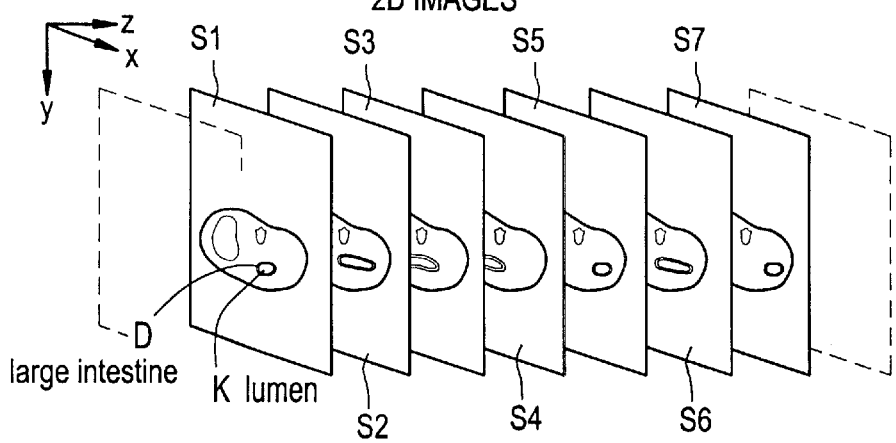
FIG. 6 is a schematic representation of a plurality of original two-dimensional images for a three-dimensional image.

FIG. 6 shows exemplary two-dimensional images S1–S7 obtained from the plurality of successive slice positions.

In the two-dimensional images S1–S7, reference symbol D designates the large intestine, and reference symbol K designates the internal space, or the lumen, of the large intestine D.

The two-dimensional images S1–S7 are tomographic images in planes orthogonal to the z-axis. The z-axis represents an axis of movement for the subject H in the scanner apparatus 1a, the x-axis represents a horizontal axis perpendicular to the z-axis, and the y-axis represents a vertical axis perpendicular to the z-axis.

Figure 7:
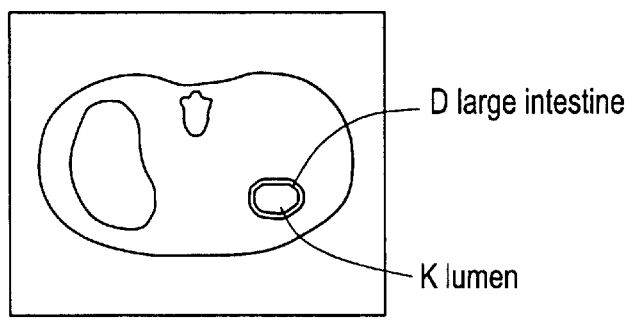
FIG. 7 illustrates a selected one of the two-dimensional images.

Returning to FIG. 5, in Step V2, the operator selects an appropriate one of the plurality of successive two-dimensional images using the input device 4. For example, a two-dimensional image S5 is selected, as shown in FIG. 7.

In Step V3, the operator reads a CT value range of the internal tissue whose three-dimensional image in the endoscopic mode is to be produced (e.g., the large intestine D) from the selected two-dimensional image, and inputs the CT value range. For example, if a CT value range for pixels representing the large intestine D is "equal to or greater than 300" in the two-dimensional image S5, the value "300" is input as a lower limit of the CT value range (if necessary, an upper limit may additionally be input).

Figure 2:
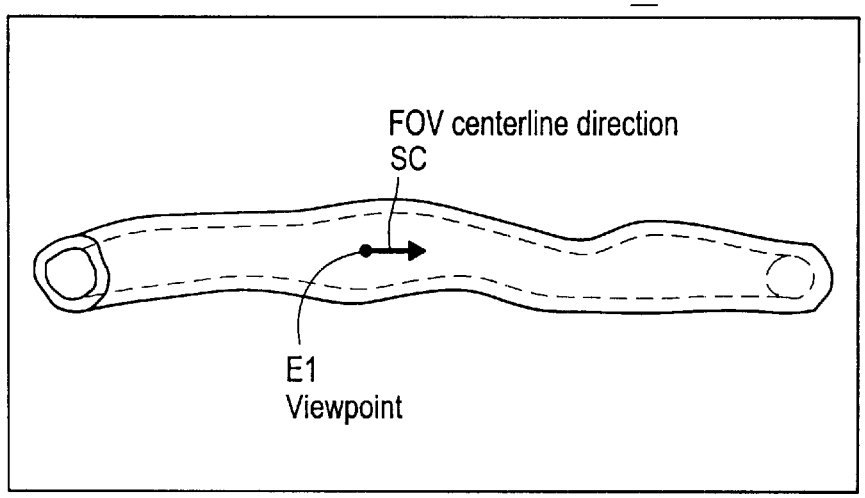
FIG. 2 exemplarily shows a screen for specifying a viewpoint position and a field-of-view centerline direction.

In Step V4, the operator fixes a viewpoint position in the internal space of the internal tissue, and inputs the viewpoint, and also inputs a field-of-view centerline direction. For example, an image T of the internal tissue produced by extracting pixels within the CT value range input in Step V3 is displayed as shown in FIG. 2, and a viewpoint position E1 and a field-of-view centerline direction SC are input in the internal tissue image T.

In Step V5, the operator selects a mode of a screen to be displayed.

In Step V6, if the super wide-angle endoscopic screen is selected as the mode of a screen to be displayed, the process goes to Step V7, otherwise to Step V8.

In Step V8, if the omnidirectional periscopic screen is selected as the mode of a screen to be displayed, the process goes to Step V9, otherwise to Step V10.

In Step V7, a super wide-angle endoscopic image is produced and displayed. Then the process is terminated. Specifically, as shown by a sectional end view in FIG. 8 and by a sectional perspective view in FIG. 9, an image is produced and displayed providing a view from the viewpoint E1 in the field-of-view centerline direction SC with a view angle θ of about 200°, for example. The display image is exemplarily shown in FIG. 10. In the display image of FIG. 10, the position of the view angle 180° is indicated by a circle in broken line, and the position of the view angle θ is indicated by a circle in solid line. Moreover, one can observe a tumor Y. The tumor Y could not be observed by conventional endoscopic images having a view angle smaller than 180°.

Figure 3:
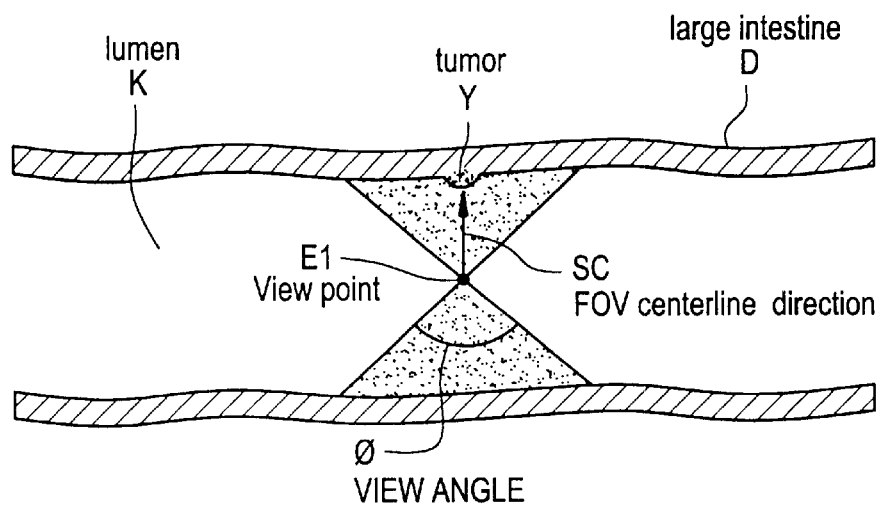
FIG. 3 is a sectional end view illustrating the concept of looking 360° around about a viewpoint.
Figure 4:
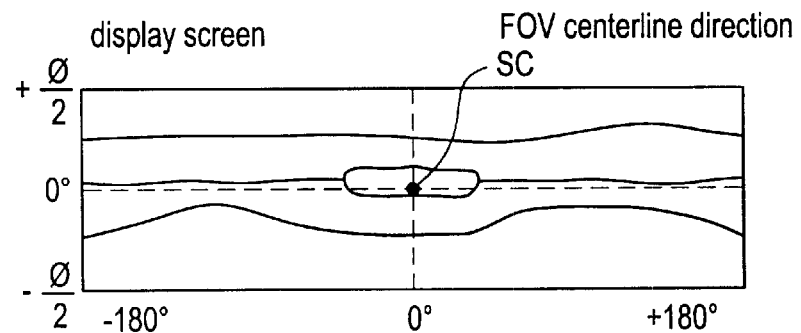
FIG. 4 exemplarily shows an omnidirectional periscopic screen.
Figure 11:
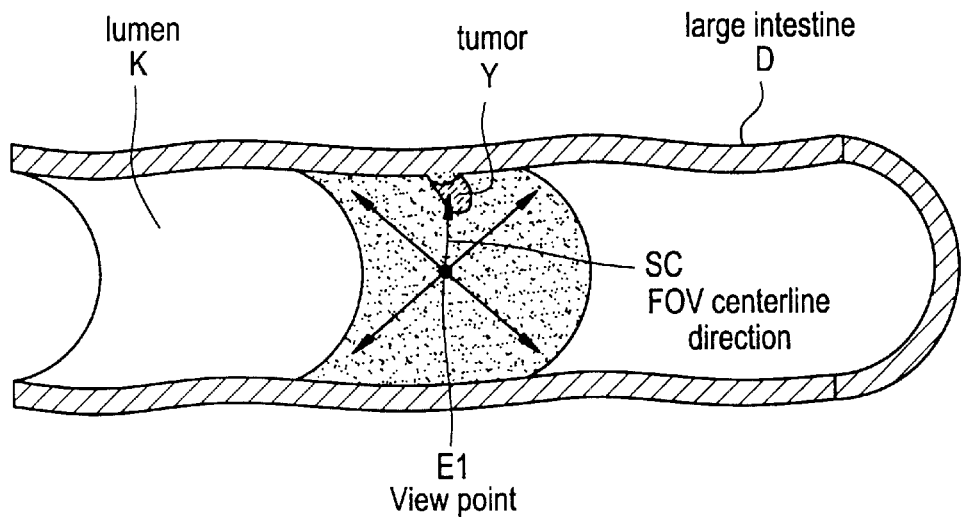
FIG. 11 is a sectional perspective view illustrating the concept of looking 360° around about a viewpoint.
Figure 12:
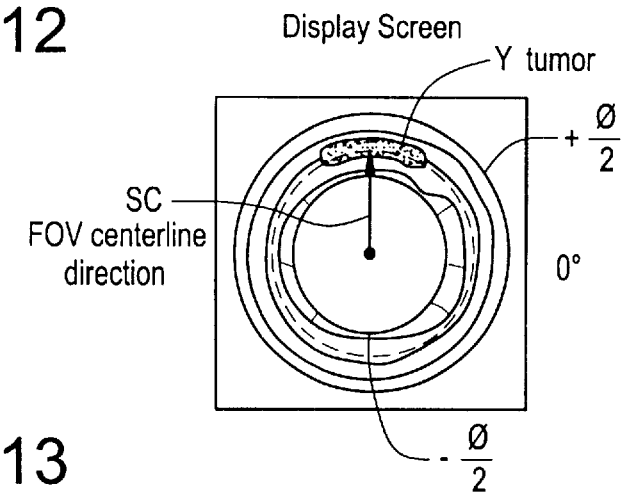
FIG. 12 exemplarily shows another omnidirectional periscopic screen.

Returning to FIG. 5, in Step V9, an omnidirectional periscopic image is produced and displayed. Then the process is terminated. Specifically, as shown by a sectional end view in FIG. 3 and by a sectional perspective view in FIG. 11, an image is produced and displayed providing a view from the viewpoint E1 in the field-of-view centerline direction SC with a view angle φ of about 90°, for example, and 360° around about a rotation center axis which is orthogonal to the field-of-view centerline direction SC and passes the viewpoint E1. The display image is exemplarily shown in FIG. 4. The display image of FIG. 4 shows the large intestine D as if it is cut into a short cylinder and unfolded into a strip-like shape so that its whole wall surface can be observed. The display image may be unfolded into a doughnut-like shape as shown in FIG. 12.

Figure 13:
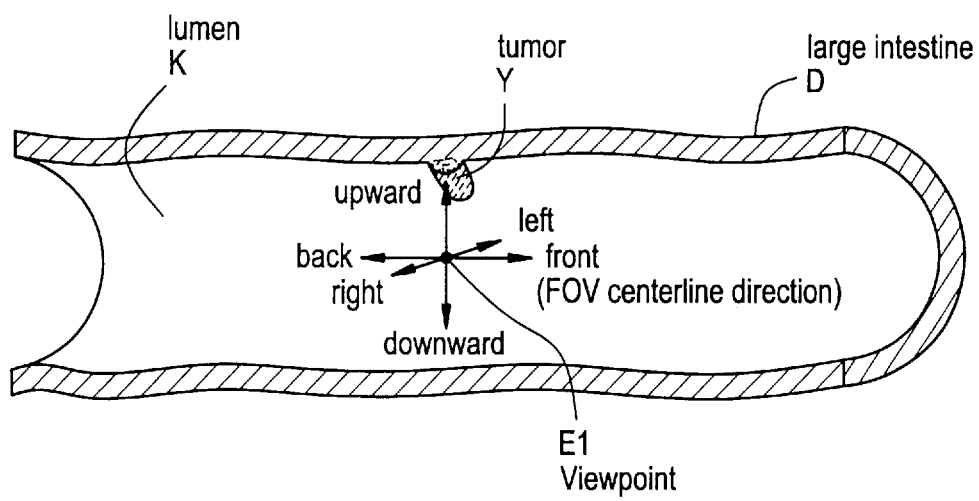
FIG. 13 illustrates the front, back left, right, upward and downward directions with respect to a viewpoint.

Returning to FIG. 5, in Step V10, a multi-image screen is produced and displayed. Then the process is terminated. Specifically, as shown by a sectional perspective view in FIG. 13, a screen is produced and displayed which enables the simultaneous observation of front (in the field-of-view centerline direction), back, left, right, upward and downward images providing respective views from the viewpoint E1 in three orthogonal directions including the axis of the field-of-view centerline direction and having the viewpoint E1 as an origin. The display image is exemplarily shown in FIG. 14.

Although the large intestine is taken as an example of a three-dimensional tissue which is an object to be displayed in the abovedescribed embodiment, the present image display method can be applied to image display of any three-dimensional tissue which may have a cavity therein, such as the small intestine, stomach, esophagus, trachea, urethra, vagina, uterus and oviduct.

Moreover, although image information is acquired by a scanner apparatus in an X-ray CT apparatus in the above embodiment, data acquired by, for example, an MRI apparatus may be employed. That is, data may be acquired by any means as long as three-dimensional information can be constructed from the data.

Furthermore, although data for a plurality of two-dimensional images are employed to produce a three-dimensional image in the above embodiment, three-dimensional volumetric data may be alternatively employed.

In addition, although the above description has been made on an image display apparatus of the present invention as incorporated in an X-ray CT apparatus, the image display apparatus may operate separately from image information acquisition means as long as the image display apparatus is placed under circumstances so as to have an access to accumulated image information.

Many widely different embodiments of the invention may be configured without departing from the spirit and the scope of the present invention. It should be understood that the present invention is not limited to the specific embodiments described in the specification, except as defined in the appended claims.

What is claimed is:

1. An image displaying method comprising the steps of:
   acquiring a plurality of successive two-dimensional images of an internal tissue and walls thereof;
   selecting one two-dimensional image from said plurality of two-dimensional images;
   providing a CT value range of said internal tissue to a screen mode;
   providing a view point position and field of view center line direction to said two-dimensional image on said screen mode; and
   selecting said screen mode from a super-wide angle endoscopic screen, a multi-image screen, and an omni-directional periscopic screen, so that the inner wall of a three-dimensional internal tissue is viewed using said view point position and said center line direction within a wide range on a single screen.

2. The method of claim 1, wherein a view is obtained in a field of view center line direction with a view angle greater than 180°.

3. The method of claim 2, wherein said screen mode is a super-wide angle endoscopic screen, and further comprising the step of displaying thereon said three-dimensional image of the walls of said internal tissue at a wide rnage of views.

4. The method of claim 1, wherein a view is obtained in a view 360° around about a view point with a view smaller than 180°.

5. The method of claim 4, wherein said screen mode is an omni-directional periscopic screen, and further comprising the step of displaying thereon said three-dimensional image of the walls of said internal tissue at a wide range of views.

6. The method of claim 1, wherein a plurality of images are obtained with respective views from a view point in directions of three orthogonal axes including the axis of a field of view center line direction and having said view point as an origin.

7. The method of claim 6, wherein said screen mode is a multi-image screen, and further comprising the step of displaying thereon said three-dimensional image of the walls of said internal tissue at a wide range of views.

8. An image displaying apparatus comprising:

first means for acquiring a plurality of successive two-dimensional images of an internal tissue and walls thereof;

second means for selecting one two-dimensional image from said plurality of two-dimensional images;

third means for providing a CT value range of said internal tissue to a screen mode;

fourth means for providing a view point position and field of view center line direction to said two-dimensional image on said screen mode; and fifth means for selecting said screen mode from a super-wide angle endoscopic screen, a multi-image screen, and an omni-directonal periscopic screen, so that the inner wall of a three-dimensional internal tissue is viewed using said view point position and said center line direction within a wide range on a single screen.

9. The apparatus of claim 8, wherein said fourth means comprises means for obtaining a view in a field of view center line direction with a view angle greater than 180°.

10. The apparatus of claim 9, wherein said fifth means comprises means for selecting a super-wide angle endoscopic screen, and further comprising means for displaying thereon said three-dimensional image of the wall of said internal tissue within a wide range of views.

11. The apparatus of claim 8, wherein said fourth means comprises means for obtaining a view which is 360° around a view point with a view angle smaller than 180°.

12. The apparatus of claim 11, wherein said fifth means comprises means for selecting an omni-directional periscopic screen; and further comprising means for displaying thereon a three-dimensional image of the walls of said internal tissue within a wide range of views.

13. The apparatus of claim 8, wherein said fourth means comprises means for providng respective views from a view point in directions of three orthogonal axes including the axis of a field of view center line direction and having said view point as an origin.

14. The apparatus of claim 13, wherein said fifth means comprises means for selecting a multi-image screen, and further comprising means for displaying thereon a three-dimensional image of the walls of said internal tissue within a wide range of views.

* * * * *